United States Patent
Jang et al.

(10) Patent No.: US 6,353,547 B1
(45) Date of Patent: Mar. 5, 2002

(54) THREE-LEVEL SOFT-SWITCHED CONVERTERS

(75) Inventors: Yungtaek Jang, Apex; Milan M. Jovanovic, Cary, both of NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/819,699

(22) Filed: Mar. 29, 2001

Related U.S. Application Data

(63) Continuation-in-part of application No. 09/652,869, filed on Aug. 31, 2000, and a continuation-in-part of application No. 09/775,636, filed on Feb. 5, 2001.

(51) Int. Cl.$^7$ ............................................. H02M 7/5387
(52) U.S. Cl. ............................ 363/132; 363/16; 363/17
(58) Field of Search ............................. 363/16, 17, 56, 363/98, 131, 132

(56) References Cited

U.S. PATENT DOCUMENTS

| | | | | |
|---|---|---|---|---|
| 6,016,258 A | * | 1/2000 | Jain et al. | 363/17 |
| 6,147,886 A | * | 11/2000 | Wittenbreder | 363/17 X |
| 6,246,599 B1 | * | 6/2001 | Jang et al. | 363/132 |

OTHER PUBLICATIONS

T. A. Meynard et al, "Multi–Level Conversion: High Voltage Choppers and Voltage–Source Inverters," IEEE Power Electronics Specialists' Conf. Rec., pp. 397–403, 1992, (No Month).

J. R. Pinheiro et al, "Three–Level ZVS PWM Converter: A New Concept in High–Voltage DC–to–DC Conversion," IEEE Int'l Conf. on Industrial Electronics, Control, Instrumentation, and Automation (IECON) Proc., pp. 173–178, 1992, (No Month).

J. S. Lai et al, "Multilevel Converters—A New Breed of Power Conversion," IEEE Trans. Ind. App., vol. 32, No. 3, May/Jun. 1996, pp. 509–517.

I. Barbi et al, "DC/DC Converter for High Input Voltage: Four Switches with Peak Voltage of Vin/2, Capacitive Turn–Off Snubbing, and Zero–Voltage Turn–On," IEEE 1998, pp 1–7, (No Month).

F. Canales et al, "A Zero Voltage Switching Three–Level DC/DC Converter," IEEE 2000, pp. 512–517, (No Month).

* cited by examiner

*Primary Examiner*—Jessica Han
(74) *Attorney, Agent, or Firm*—Venable

(57) ABSTRACT

Three-level, constant-frequency, soft-switched isolated converters provide zero-voltage-switching (ZVS) conditions for the turn-on of all primary switches over a wide range of input voltage and output load. These converters achieve ZVS with the minimum duty cycle loss and circulating current, which optimizes the conversion efficiency. The ZVS of the primary switches is achieved by the energy stored in an inductor on the primary side of the isolation transformer. The inductor and transformer are arranged so that a change in the phase shift between the outer and inner pair of switches of the series connection of four switches changes the volt-second product on the windings of the transformer and the windings of the inductor in opposite directions. In some embodiments the primary-side inductor is coupled inductor with two windings, whereas in the other embodiments the inductor has only one winding.

12 Claims, 12 Drawing Sheets

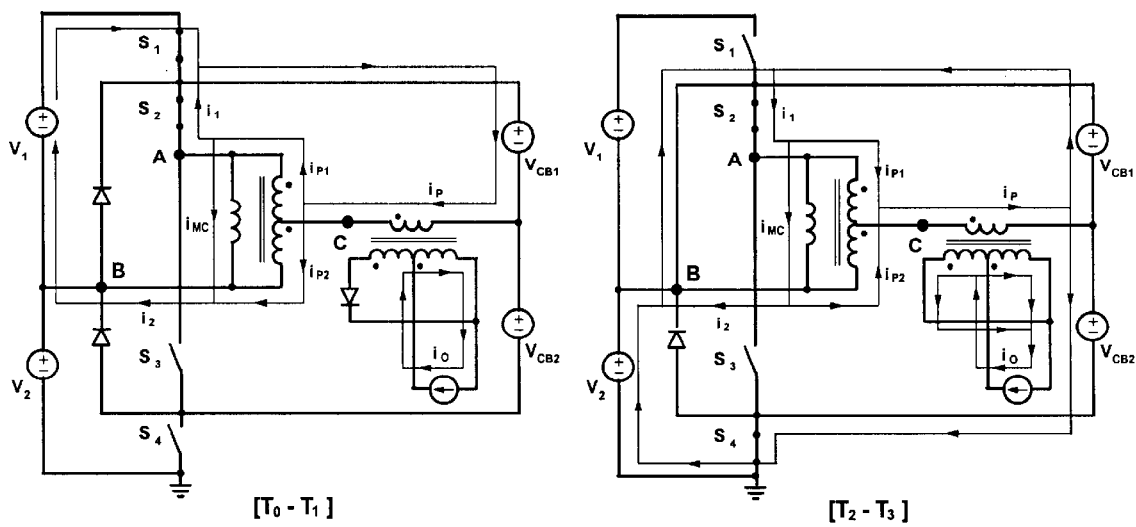
Fig. 6(a) [T₀ - T₁]
Fig. 6(c) [T₂ - T₃]
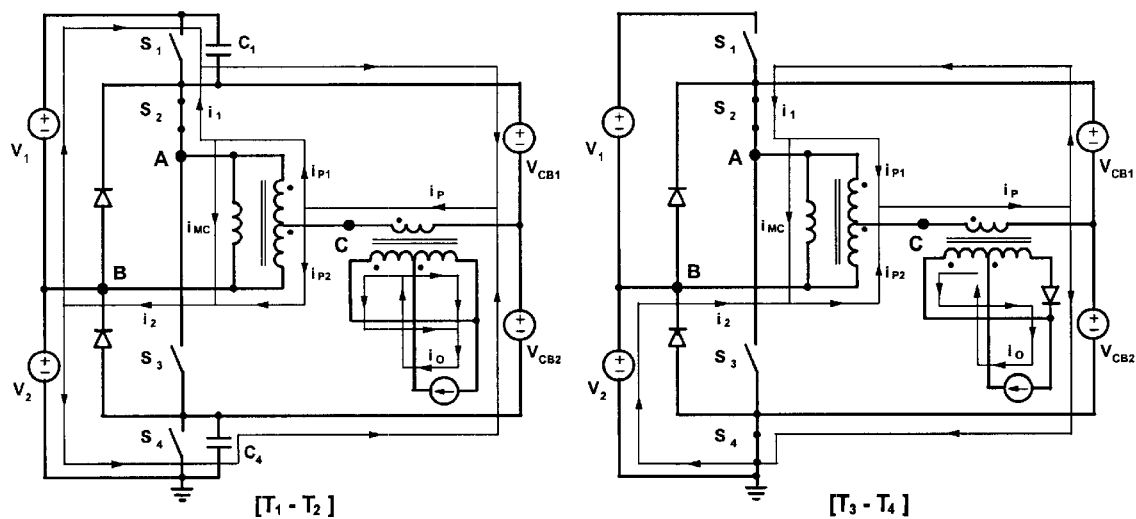
Fig. 6(b) [T₁ - T₂]
Fig. 6(d) [T₃ - T₄]

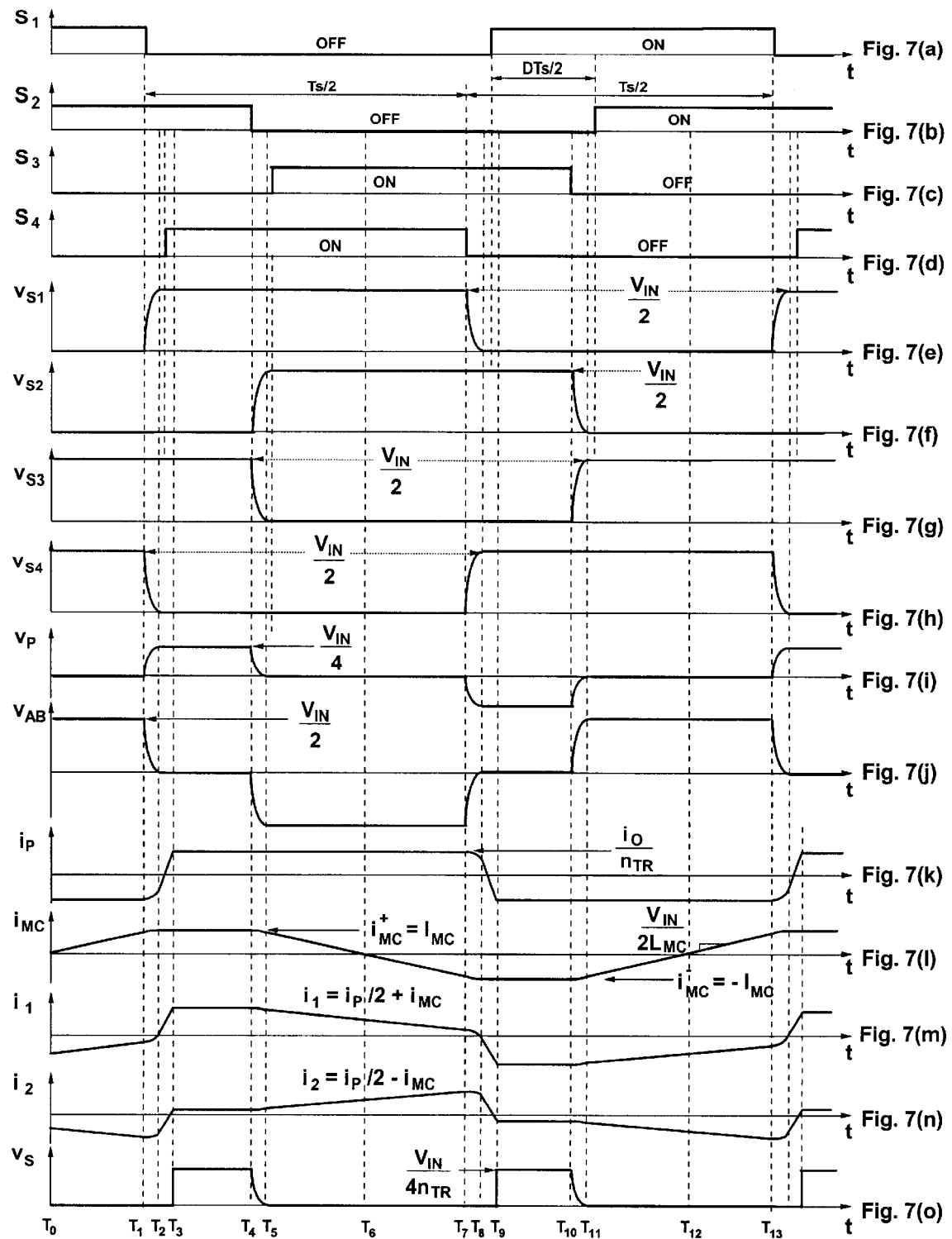

THREE-LEVEL SOFT-SWITCHED CONVERTERS

CROSS REFERENCE TO RELATED APPLICATIONS

This is continuation-in-part of patent application Ser. No. 09/652,869, entitled "Soft-switched Full-Bridge Converter" filed on Aug. 31, 2000 and patent application Ser. No. 09/775,636, entitled "Soft-Switched Full-Bridge Converter" filed on Feb. 5, 2001.

BACKGROUND OF THE INVENTION

1. Field of the Invention

This invention relates to power converters, and more particularly, to the high-voltage power converters.

2. Description of the Prior Art

Generally, high-voltage power conversion applications require switching devices with high voltage ratings since the voltage rating of a switch is determined by the input and/or output voltage of the converter. For example, in conventional, isolated step-down converters, i.e., in converters with a transformer isolation that have the output voltage lower than the input voltage, the voltage stress on the primary-side switching devices is determined by the input voltage and the converter's topology. The primary-side switches in bridge-type topologies such as half-bridge and fall-bridge converters are subjected to the minimal voltage stress that is equal to the input voltage. However, the voltage stress of the switches in single-ended topologies such as the single-switch forward and flyback converters is significantly higher than the input voltage.

Achieving a high efficiency in high-voltage applications is a major design challenge that requires the optimization of the conduction and switching losses through a careful selection of the converter topology and switching device characteristics. Namely, higher voltage rated semiconductor switches such as MOSFETs (Metal Oxide Semiconductor Field Effect Transistors), IGBT (Insulated-Gate Bipolar Transistors), and BJTs (Bipolar Junction Transistors) exhibit larger conduction losses compared to their counterparts with a lower voltage rating. In addition, in high-voltage applications switching losses are also increased. Generally, switching losses can be reduced and even eliminated by resorting to a variety of resonant or soft-switching topologies. However, the approaches to reducing the conduction losses are much more limited. In fact, once the topology and the switches with the lowest conduction losses for the required voltage rating are selected, the only approach that can further decreases the conduction losses is to employ a topology that can utilize switches with a lower voltage rating and, consequently, a lower conduction loss. Since in the class of circuits known as multilevel converters primary-side switches operate with a voltage stress that is much less than the input voltage, the multilevel converters are a natural choice in high-voltage applications. So far, a number of multilevel dc/ac and dc/dc converters have been described in the literature.

As an example, FIG. 1 shows a three-level, zero-voltage-switched (ZVS) dc/dc converter introduced in article "DC/DC Converter for High Input Voltage: Four Switches with Peak Voltage of $V_{IN}/2$, Capacitive Turn-off Snubbing, and Zero-Voltage Turn-on," by I. Barbi et al., published in the *IEEE Power Electronics Specialists' Conf. Rec.*, pp. 1–7, 1998. The converter in FIG. 1 offers ZVS turn-on of all four primary switches and constant-frequency of operation with pulse-width-modulation (PWM) control with the voltage stress of the primary switches limited to $V_{IN}/2$. However, because the circuit in FIG. 1 relies on the energy stored in the leakage inductance of transformer TR to create conditions for ZVS of switches $Q_2$ and $Q_4$, the ZVS of switches $Q_2$ and $Q_4$ can only be achieved in a very limited load range around the full load, unless the leakage inductance is significantly increased, or a relatively large external inductance is added in series with the primary winding of the transformer. It should be noted that in FIG. 1 the inductance of inductor L represents the sum of the leakage inductance of the transformer and the externally added inductance, if any. The increase of the inductance in series with the primary winding has a detrimental effect on the performance of the circuit because it reduces the effective secondary-side duty cycle and produces severe parasitic ringing due to the interaction of the inductance with the junction capacitance of the non-conducting secondary-side rectifier. Generally, the reduction of the secondary-side duty cycle needs to be compensated by a reduction of the turns ratio of the transformer, which increases the conduction losses on the primary side because the reflected load current into the primary of the transformer is also increased. To damp the parasitic ringing, a heavy secondary-side snubber circuit is required, which further degrades the conversion efficiency.

As another example, FIG. 2 shows a three-level, soft-switched dc/dc converter described in article "A Zero Voltage Switching Three Level DC/DC Converter," by F. Canales et al., published in the *Proceedings of IEEE International Telecommunications Energy Conference* (INTELEC), pp. 512–517, 2000. The three-level converter in FIG. 2 also features ZVS turn-on of all four switches $Q_1$ through $Q_4$. In addition, by employing "flying capacitor" $C_B$ it also features a constant-frequency operation with the phase-shift control. The circuit in FIG. 2 utilizes the energy stored in the output-filter inductor to achieve ZVS of outer switches $Q_1$ and $Q_4$, and energy stored in the leakage inductance of the transformer to achieve ZVS of inner switches $Q_2$ and $Q_3$. As a result, ZVS of the outer switches can be achieved in a wide load range, whereas the ZVS range of the inner switches is very limited unless the leakage inductance is significantly increased, and/or a large external inductance is added in series with the primary winding. As already explained, the leakage inductance increase and/or the addition of an external inductor have a detrimental effect on the performance of the circuit.

Recently, a soft-switching full-bridge technique that achieves ZVS of the primary switches in the entire load and line range with virtually no loss of secondary-side duty cycle and with minimum circulating energy was described in patent application Ser. No. 09/652,869 filed Aug. 31, 2000, by Jang and Jovanovic. One implementation of this technique is shown in FIG. 3. The circuit in FIG. 3 utilizes the energy stored in the magnetizing inductance of coupled inductor $L_C$ to discharge the capacitance across the switch that is about to be turned on and, consequently, achieve ZVS. By properly selecting the value of the magnetizing inductance of the coupled inductor, the primary switches in the converter in FIG. 3 can achieve ZVS even at no load. Because in the circuit in FIG. 3 the energy required to create ZVS conditions at light loads does not need to be stored in the leakage inductance, the transformer leakage inductance can be minimized. As a result, the loss of the duty cycle on the secondary-side is minimized, which maximizes the turns ratio of the transformer and, consequently, minimizes the primary-side conduction losses. In addition, the minimized leakage inductance of the transformer significantly reduces the secondary-side ringing caused by the resonance between the leakage inductance and junction capacitance of the rectifier, which greatly reduces the power dissipation of a snubber circuit that is usually used to damp the ringing.

In this invention, the concept employed to achieve ZVS of the primary switches in the converter in FIG. 3 is extended to three-level converters.

SUMMARY OF THE INVENTION

In this invention, a number of three-level, constant-frequency, soft-switched isolated converters that can achieve substantially zero-voltage turn-on of the primary switches in a wide range of load current and input voltage are disclosed. Generally, these converters employ an inductor on the primary side of the isolation transformer to create ZVS conditions for the primary switches. In some embodiments the primary-side inductor is coupled inductor with two windings, whereas in the other embodiments the inductor has only one winding. The inductor and transformer are arranged in the circuit so that a change in the phase shift between the outer and inner pair of switches of the series connection of four switches changes the volt-second product on the windings of the transformer and the winding(s) of the inductor in opposite directions. Specifically, if the phase shift between the outer and inner pair of switches changes so that the volt-second product on the windings of the transformer decreases, the volt-second product on the windings of the inductor increases, and vice verse.

Because in the circuits of the present invention available energy for ZVS stored in the inductor increases as the load current decreases and/or input voltage increases, the circuits of the present invention can achieve ZVS in a very wide range of input voltage and load current, including no load.

In addition, since the energy used to create the ZVS condition at light loads is not stored in the leakage inductances of the transformer, the transformer's leakage inductances can be minimized, which also minimizes the duty-cycle loss on the secondary side of the transformer. As a result, the converters of this invention can operate with the largest duty cycle possible, thus minimizing both the conduction loss of the primary switches and voltage stress on the components on the secondary side of the transformer, which improves the conversion efficiency. Moreover, because of the minimized leakage inductances, the secondary-side parasitic ringing caused by a resonance between the leakage inductances and the junction capacitance of the rectifier is also minimized so that the power dissipation of a snubber circuit usually required to damp the ringing is also reduced.

The circuits of the present invention can be either implemented as dc/dc converters, or dc/ac inverters. If implemented as dc/dc converters, any type of the secondary-side rectifier can be employed such, for example, the full-wave rectifier with a center-tap secondary winding, full-wave rectifier with current doubler, or a full-bridge full-wave rectifier.

BRIEF DESCRIPTION OF THE DRAWINGS

FIGS. 6(a)–(l) show the topological stages of the soft-switched three-level dc/dc converter in FIG. 4 during a switching cycle.

FIGS. 7(a)–(o) show key waveforms of the soft-switched three-level dc/dc converter in FIG. 4: (a) driving signal of switch $S_1$; (b) driving signal of switch $S_2$; (c) driving signal of switch $S_3$; (d) driving signal of switch $S_4$; (e) voltage waveform $v_{S1}$ across switch S1; (f) voltage waveform $v_{S2}$ across switch S2; (g) voltage waveform $v_{S3}$ across switch S3; (h) voltage waveform $v_{S4}$ across switch S4; (i) primary voltage $v_P$; (j) voltage $v_{AB}$ across coupled inductor; (k) primary current waveform $i_P$; (l) magnetizing current waveform $i_{MC}$; (m) current is; (n) current $i_2$; (o) voltage at the input of the output filter $v_S$.

DETAILED DESCRIPTION OF THE INVENTION

Figure 1A:
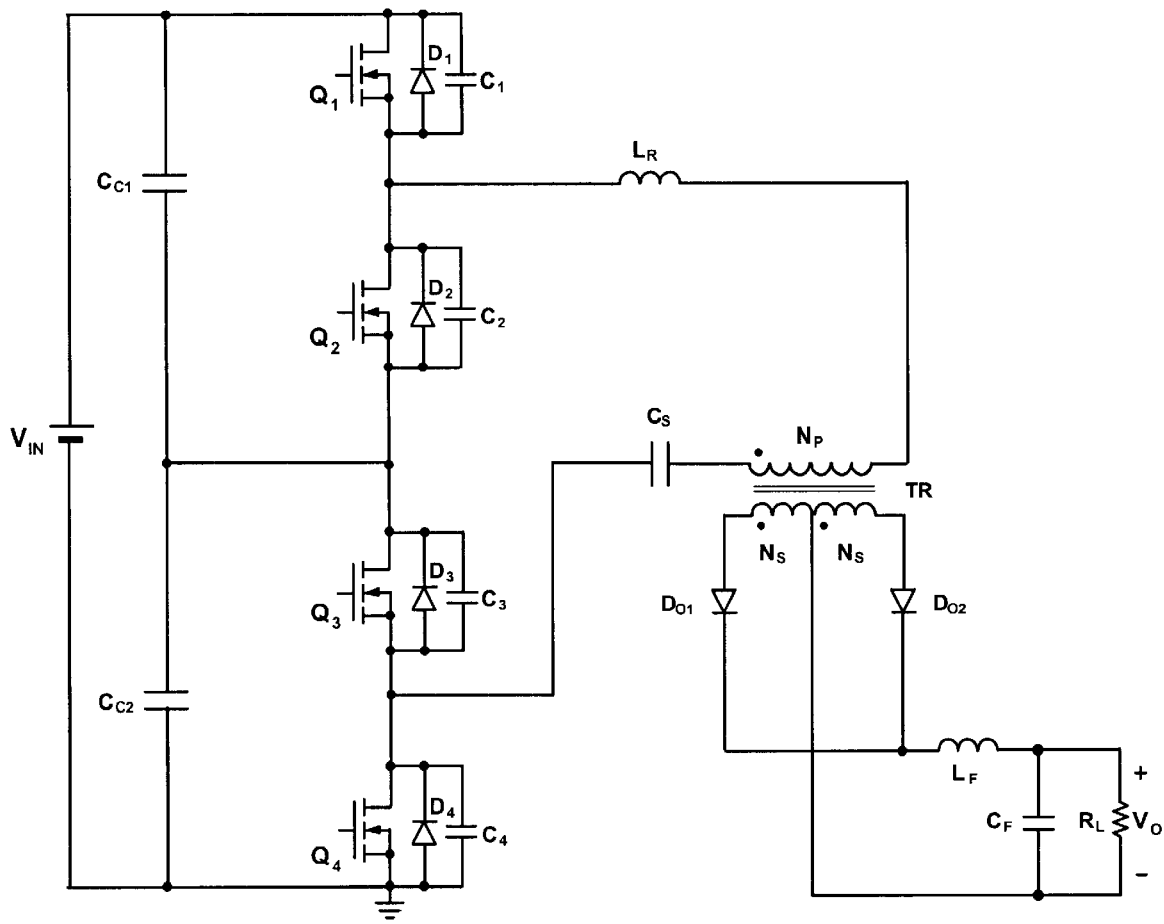
FIGS. 1(a, b) show constant-frequency, PWM, ZVS, three-level dc/dc converter: (a) power stage; (b) timing diagram of the primary switches. (prior art)
Figure 1B:
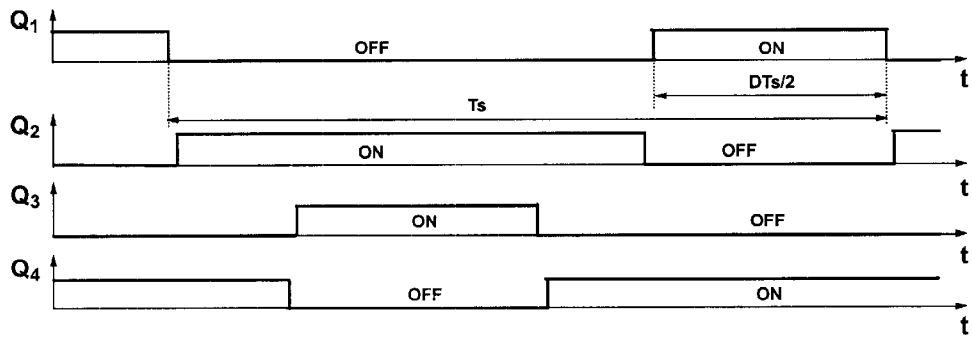
Figure 2A:
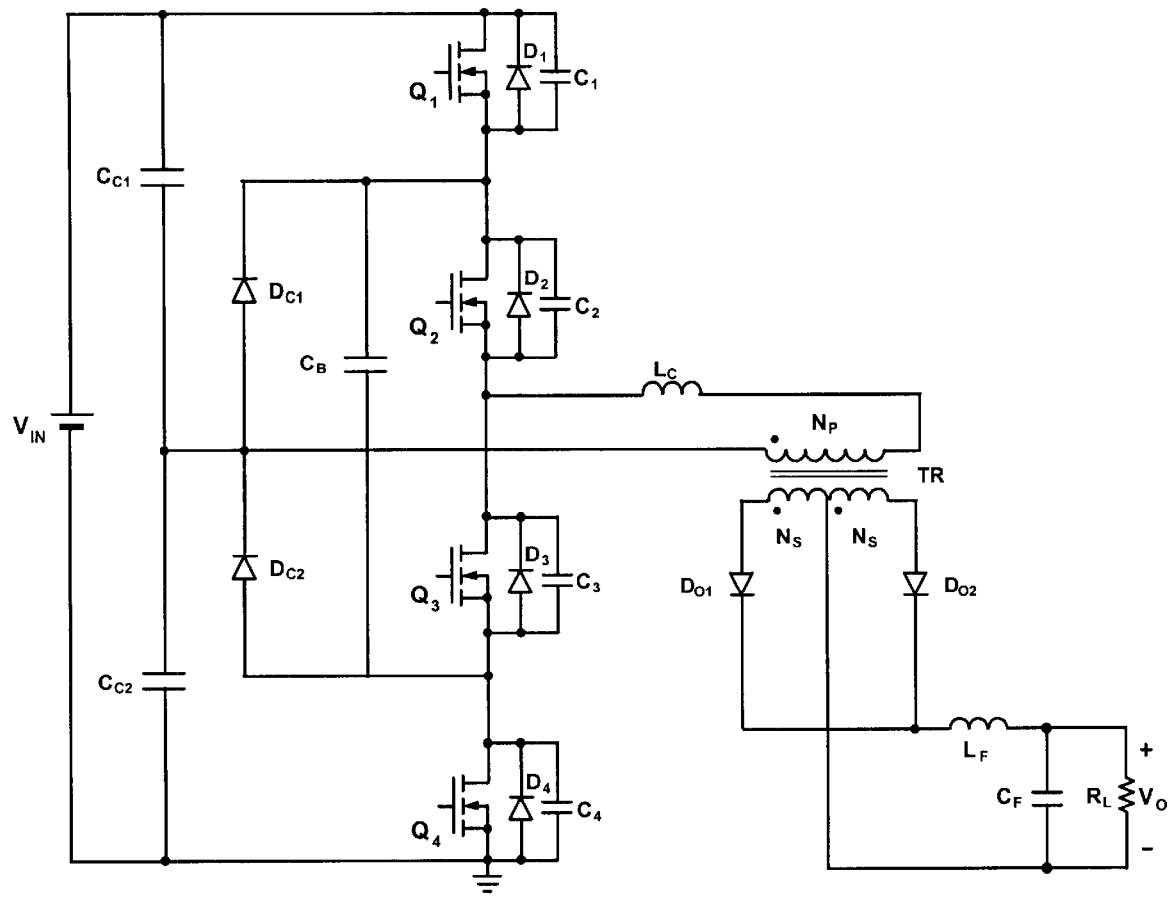
FIGS. 2(A, b) show constant-frequency, phase-shifted, ZVS, three-level dc/dc converter: (a) power stage; (b) timing diagram of the switches. (prior art)
Figure 2B:
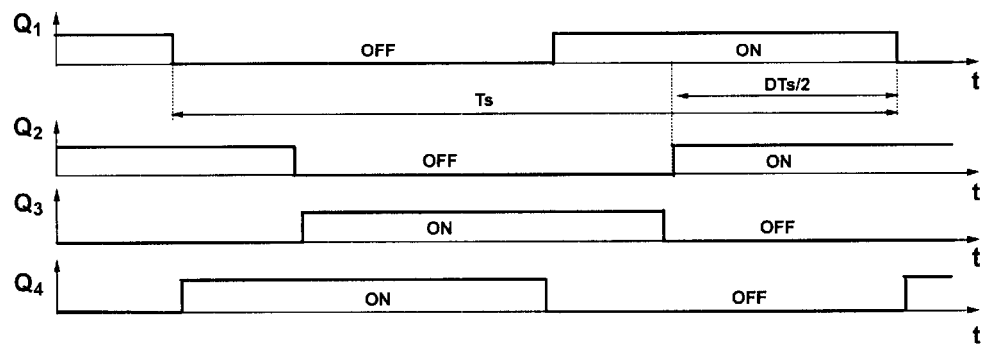
Figure 3A:
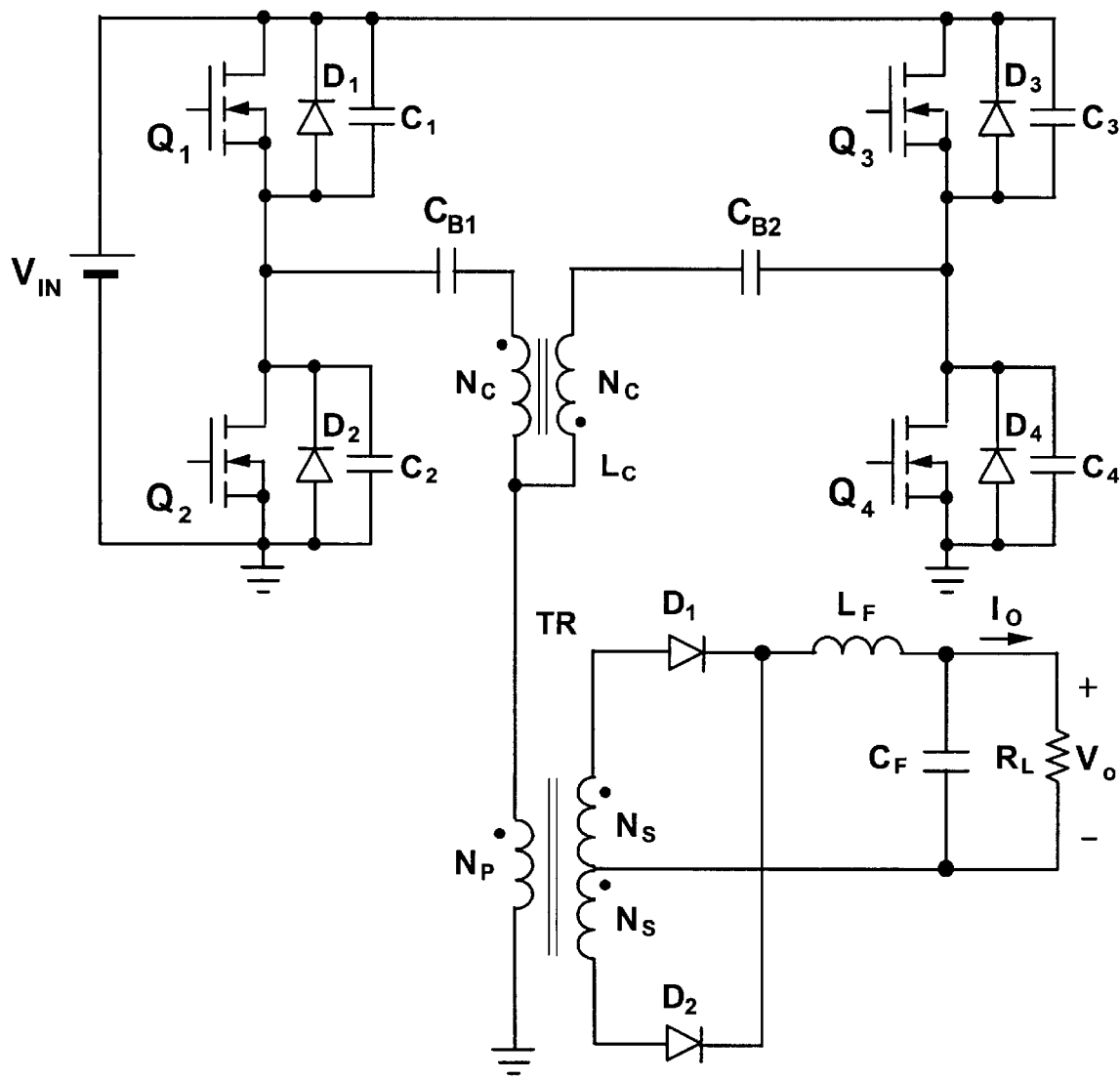
FIG. 3 shows a full-bridge converter that employs the coupled inductor to achieve ZVS of the primary switch in a wide range of input voltage and output current. (prior art)
Figure 3B:
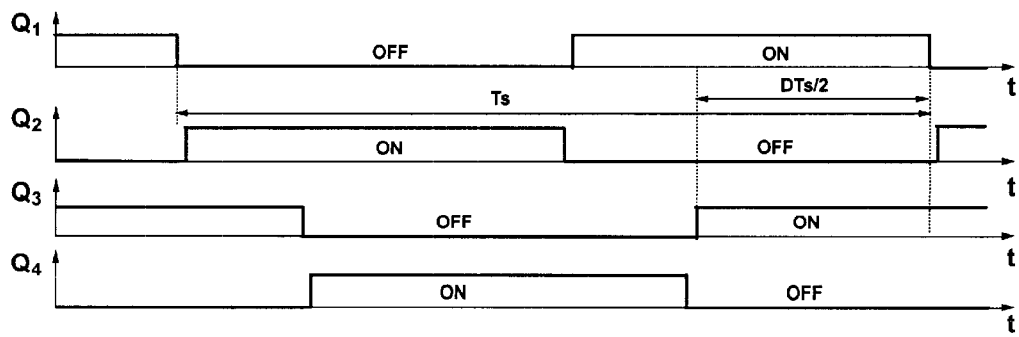
Figure 4:
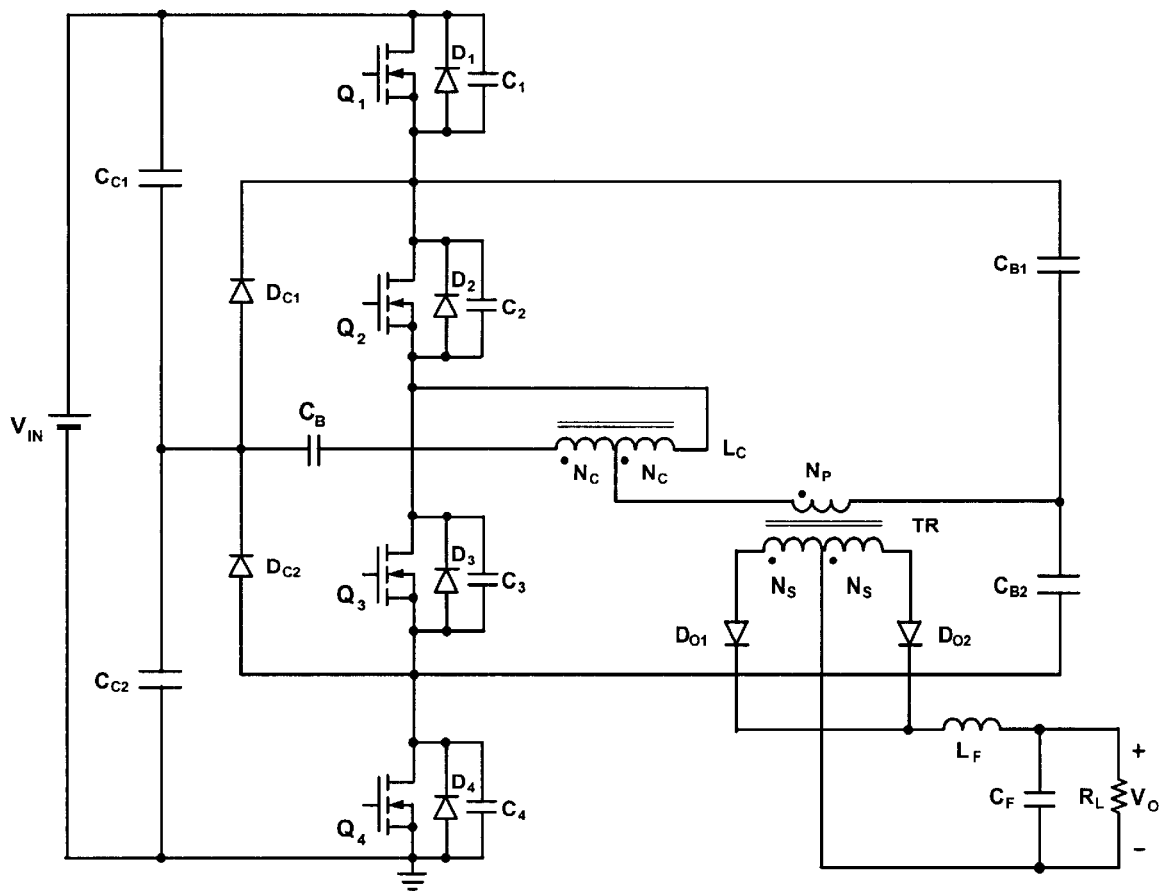
FIG. 4 shows one of the preferred embodiments of the soft-switched dc/dc three-level converter in accordance with the present invention.

FIG. 4 shows one of the preferred embodiments of the three-level soft-switched dc/dc converter in accordance with the present invention. The three-level converter in FIG. 4 consists of a series connection of four primary switches $S_1$ through $S_4$, rail-splitting capacitors $C_{C1}$ and $C_{C2}$, "flying capacitors" $C_{B1}$ and $C_{B2}$, isolation transformer TR, and coupled inductor $L_C$. In this embodiment, the load is coupled to the converter through a full-wave rectifier connected to the center-tapped secondary of the transformer. In addition, clamping diodes $D_{C1}$ and $D_{C2}$ are used to clamp the voltage of outer switches $S_1$ and $S_4$, respectively, to $V_{IN}/2$ after the switches are turned off, whereas blocking capacitor $C_B$ is employed to prevent transformer saturation in case of a volt-second imbalance on the transformer windings that may be eventually generated by circuit parasitics and a mismatching of the switches' characteristics and timing signals.

It should be noted that in the embodiment in FIG. 4, the secondary-side output circuit is implemented as the fall-wave rectifier with a center-tap secondary winding. However, the secondary-side output circuit in a dc/dc converter implementation of the present invention can also be implemented with any type of rectifier such, for example, the fall-wave rectifier with current doubler, or the full-bridge full-wave rectifier. In addition, the converters of the present invention can also be implemented as dc/ac inverters, i.e., without a rectifier circuit between the secondary winding of the transformer and load.

Figure 5:
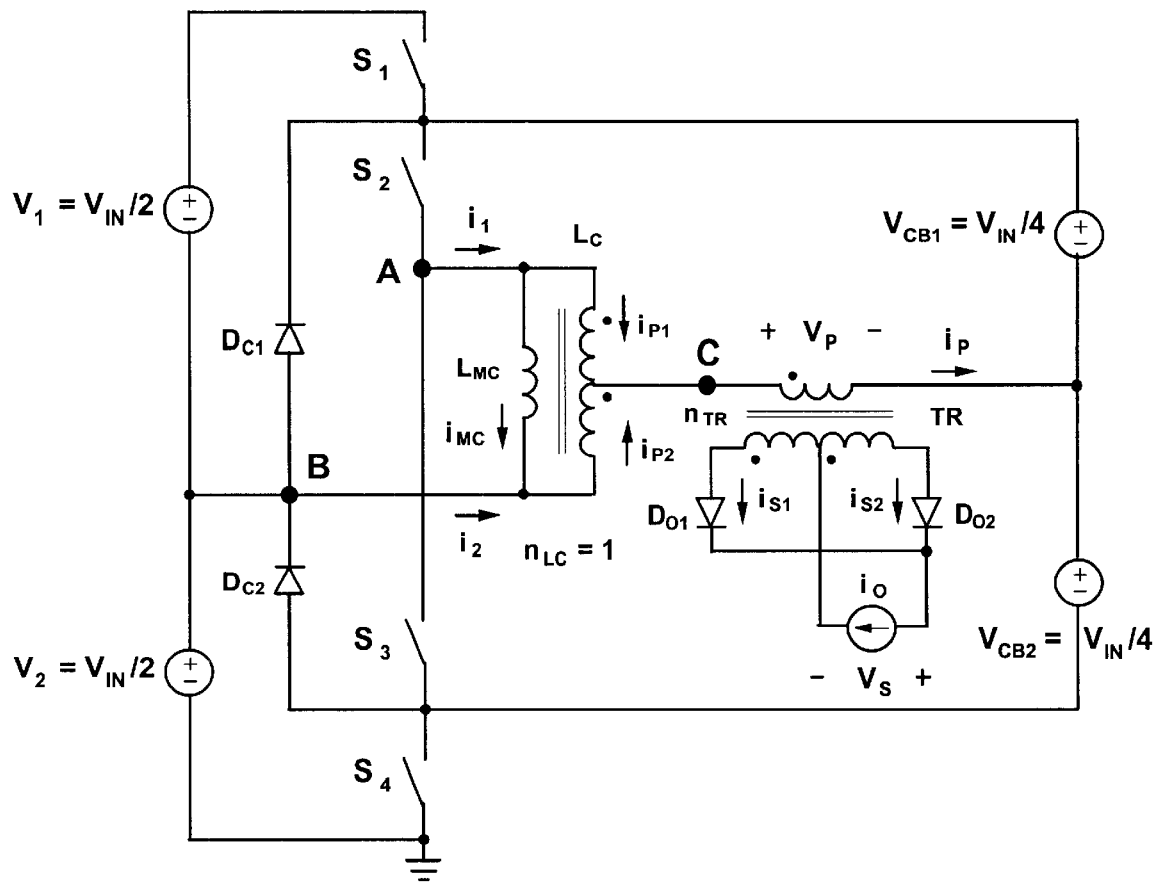
FIG. 5 is the simplified circuit of the preferred embodiment of the soft-switched three-level dc/dc converter shown in FIG. 4.

To facilitate the explanation of operation of the circuit in FIG. 4, FIG. 5 shows its simplified circuit diagram. In the simplified circuit it is assumed that inductance of output filter $L_F$ is large enough so that during a switching cycle the output filter can be modeled as a constant current source with the magnitude equal to output current $I_O$. Also, it is assumed that the capacitances of the capacitors $C_{C1}$ and $C_{C2}$, which form a capacitive divider that splits the input voltage in half, are large so that capacitors $C_{C1}$ and $C_{C2}$ can be modeled by voltage sources $V_1=V_{IN}/2$ and $V_2=V_{IN}/2$, respectively. Similarly, it is assumed that the capacitances of "flying capacitors" $C_{B1}$ and $C_{B2}$ are large enough so that the capacitors can be modeled as constant voltage sources $V_{CB1}$ and $V_{CB2}$, respectively. Because the average voltages of the coupled inductor windings and the transformer windings during a switching cycle are zero and because when a phase-shift control is used the pair of switches in each bridge leg operate with 50% duty cycle, the magnitude of voltage sources $V_{CB1}$ and $V_{CB2}$ in FIG. 5 are equal to $V_{IN}/4$, i.e., $V_{CB1}=V_{CB2}=V_{IN}/4$.

To further simplify the analysis of operation of the circuit in FIG. 4, it is also assumed that the resistance of the conducting semiconductor switches is zero, whereas the resistance of the non-conducting switches is infinite. In addition, the leakage inductances of both transformer TR and coupled inductor $L_C$, as well as the magnetizing inductance of transformer TR are neglected since their effect on the operation of the circuit is not significant. However, the magnetizing inductance of coupled inductor $L_C$ and output capacitances of primary switches $C_1$–$C_4$ are not neglected in this analysis since they play a major roll in the operation of the circuit. Consequently, in FIG. 5, coupled inductor $L_C$ is modeled as the ideal transformer with turns ratio $n_{LC}=1$ and with parallel magnetizing inductance $L_{CM}$ across the series connection of windings AC and CB, whereas transformer TR is modeled only by the ideal transformer with turns ratio $n_{TR}$. It should be noted that magnetizing inductance $L_{CM}$ of inductor $L_C$ represents the inductance measured between terminals A and B with terminal C open.

With reference to FIG. 5, the following relationships between currents can be established:

$$i_P=i_{P1}+i_{P2}, \quad (1)$$

$$i_1=i_{P1}+i_{MC} \quad (2)$$

$$i_2=i_{P2}-i_{MC} \quad (3)$$

Since the number of turns of winding AC and winding CB of coupled inductor $L_C$ are the same, it must be that $$i_{P1}=i_{P2}. \quad (4)$$

Substituting Eq. (4) into Eqs. (1)–(3) gives $$i_{P1}=i_{P2}=\frac{i_P}{2}, \quad (5)$$

$$i_1=\frac{i_P}{2}+i_{MC}, \quad (6)$$

$$i_2=\frac{i_P}{2}-i_{MC}. \quad (7)$$

As can be seen from Eqs. (6) and (7), currents $i_1$ and $i_2$ are composed of two components: primary-current component $i_P/2$ and magnetizing-current component $i_{MC}$. The primary-current component is directly depended on the load current, whereas the magnetizing current does not directly depend on the load, but rather on the volt-second product across the magnetizing inductance. Namely, a change of the magnetizing current with a change in the load current occurs only if the phase shift between the turn on instants of outer switches $S_1$ and $S_4$ and respective inner switches $S_2$ and $S_3$ is changed to maintain the output regulation. Usually, the change of the phase shift with the load change is greater at light loads, i.e., as the load decreases toward no load than at heavier loads. Since in the circuit in FIG. 4 the phase shift increases as the load approaches zero, the volt-second product of $L_{MC}$ also increases so that the circuit in FIG. 4 exhibits the maximum magnetizing current at no load, which makes possible to achieve ZVS at no load.

Because magnetizing current $i_{MC}$ does not contribute to the load current, as seen in FIG. 5, it represents a circulating current. Generally, this circulating current and its associated energy should be minimized to reduce losses and maximize the conversion efficiency. Due to an inverse dependence of the volt-second product of $L_{MC}$ on the load current, circuit in FIG. 4 circulates less energy at the fall load than at a light load, and, therefore, features ZVS in a wide load range with a minimum circulating current.

Also from FIG. 5 it can be seen that $$v_{AB}=v_{AC}+v_{CB}. \quad (8)$$

Since both winding of coupled inductor $L_C$ have the same number of turns, i.e., since the turns ratio of $L_C$ is $n_{LC}=1$, it must be that $$v_{AC}=v_{CB}, \quad (9)$$

or $$v_{AC}=v_{CB}=\frac{v_{AB}}{2}. \quad (10)$$

Generally, for a constant-frequency phase-shift control voltage $v_{AB}$ is a squarewave voltage consisting of alternating positive and negative pulses of magnitude $V_{IN}/2$ that are separated by time intervals with $v_{AB}=0$. According to Eq. (10) and with reference to FIG. 5, during the time intervals when either of inner switches $S_2$ and $S_4$ is closed and when $v_{AB}=0$, the primary voltage magnitude is $|v_P|=V_{IN}/4$, whereas during time intervals when $|v_{AB}|=V_{IN}/2$, the primary voltage magnitude is $|v_P|=0$.

To further facilitate the analysis FIG. 6 shows the topological stages of the converter during a switching cycle, whereas FIG. 7 shows the key waveforms.

Figure 6E:
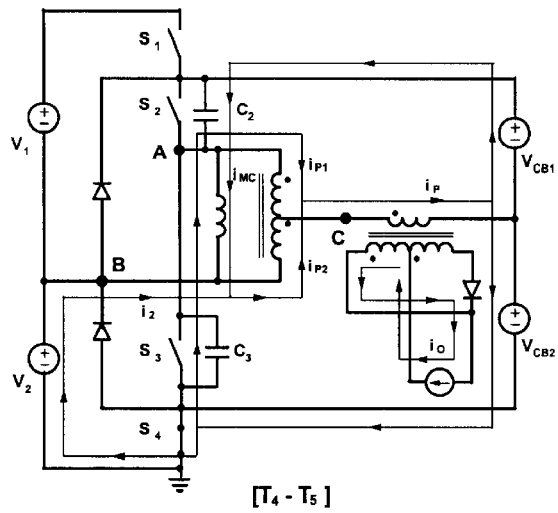
Figure 6G:
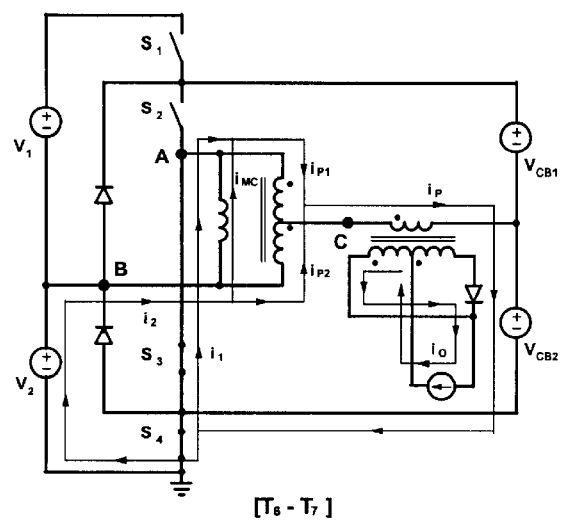
Figure 6F:
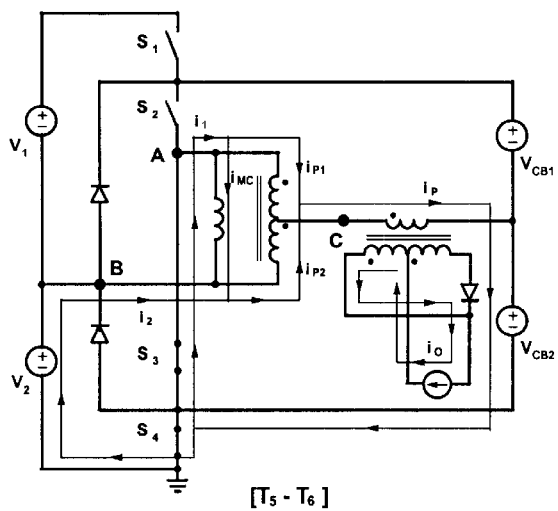
Figure 6H:
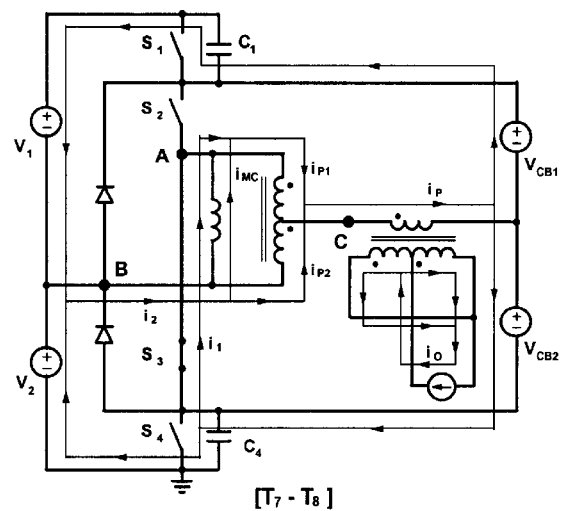
Figure 6I:
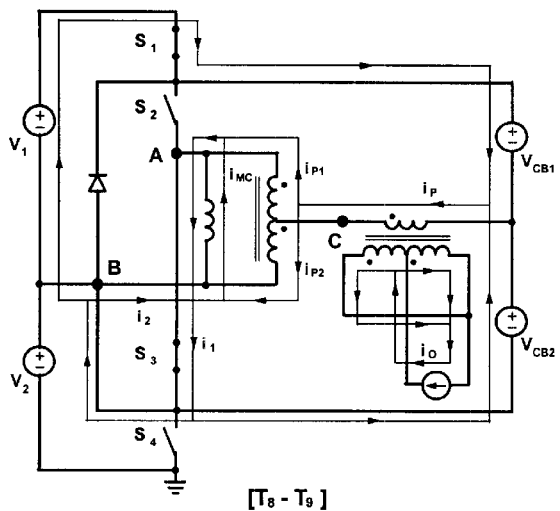
Figure 6K:
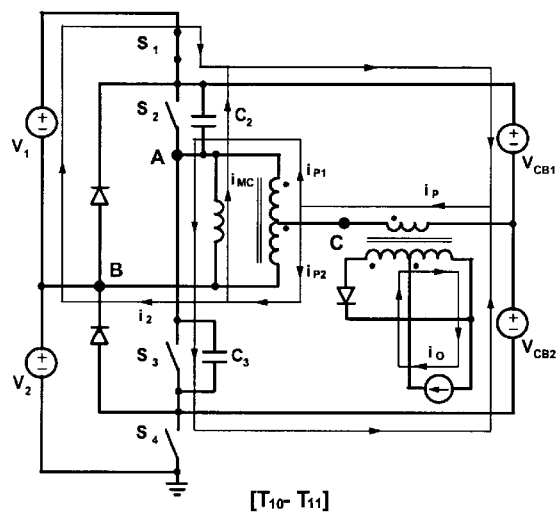
Figure 6J:
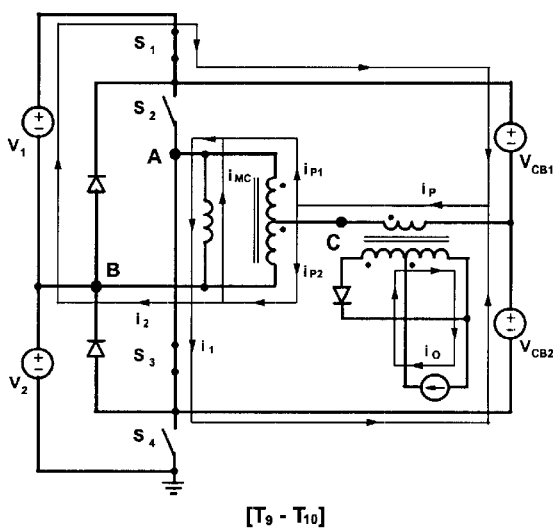
Figure 6L:
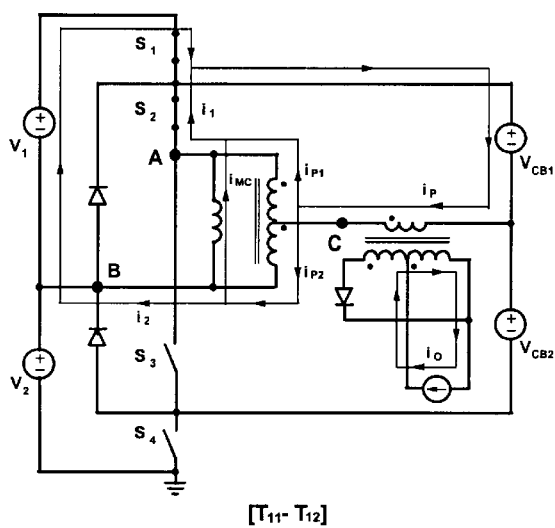

As shown in FIG. 7, since during time interval $T_O$–$T_1$ switches $S_1$ and $S_2$ are closed while switches $S_3$ and $S_4$ are open, voltage $v_{AB}=V_1=V_{IN}/2$ go that primary voltage $V_P=0$. In addition, during this topological stage, whose equivalent circuit is shown in FIG. 6(a), output current $I_O$ flows through output rectifier $D_{O2}$ and the corresponding secondary of the transformer so that primary current $i_P=-I_O/n_{TR}$, where $n_{TR}=N_P/N_S$ is the turns ratio of the transformer, $N_P$ is the number of primary winding turns, and $N_S$ is the number of secondary winding turns. Because the primary current is negative both currents $i_1$ and $i_2$ are also negative, as shown in FIGS. 7(m) and (n). At the same time, magnetizing current $i_{MC}$ is linearly increasing with slope $V_{IN}/(2L_{MC})$ due to the positive voltage $v_{AB}=V_{IN}/2$, which increases $i_1$ and decreases $i_2$. During this entire stage, voltage $v_S$ at the input of the output filter, which is equal to the secondary voltage, is zero because primary voltage $v_P$ is zero. This stage ends at $t=T_1$ when switch $S_1$ is turned off.

After switch $S_1$ is turned off at $t=T_1$, the current which was flowing through the transistor of switch $S_1$ is diverted to switch's output capacitance $C_1$, as shown in FIG. 6(b). In this topological stage, current $i_2$ charges capacitor $C_1$ and discharges capacitor $C_4$ at the same rate since the sum of the voltages across capacitors $C_1$ and $C_4$ is equal to constant voltage $V_{IN}/2$. As a result, voltage across switch $S_1$ increases while voltage across switch $S_4$ decreases, as illustrated in FIGS. 7(e) and (h). In addition, during this stage the potential of point A decreases causing a decrease of voltage $v_{AB}$ from $V_{IN}/2$ toward zero and the simultaneous increase of primary voltage $v_P$ from zero toward $V_{IN}/4$, as illustrated in FIGS. 7($i$) and ($j$). The positive primary voltage initiates the commutation of output current $I_O$ from rectifier $D_{O2}$ to rectifier $D_{O1}$. With the leakages inductances of transformer TR neglected, this commutation is instantaneous. However, in the presence of leakage inductances, the commutation of the current from one rectifier to the other takes time. Because during this commutation time both rectifiers are conducting, i.e., the secondaries of the transformer are shorted, voltage $v_S$ is zero, as shown in FIG. 7($o$).

After capacitor $C_4$ is filly discharge at $t=T_2$, i.e., after voltage $V_{S4}$ reaches zero, current $i_2$ continues to flow through antiparallel diode $D_4$ of switch $S_4$ and clamp diode $D_{C1}$ instead through $C_1$ and $C_4$, as shown in FIG. 6($c$). Due to positive voltage $V_{IN}/4$ applied across the primary winding, currents $i_P$, $i_1$, and $i_2$ are increasing from negative to positive direction. To achieve ZVS of switch $S_4$, switch $S_4$ needs to be turned on during the time interval its antiparallel diode $D_4$ is conducting, as illustrated in FIG. 7. The stage in FIG. 6($c$) ends at $t=T_3$ when the output current $I_O$ is completely commutated from rectifier $D_{O2}$ to rectifier $D_{O1}$, i.e., when primary current becomes $i_P = I_O/n_{TR}$.

During time interval $T_3 - T_4$ current $i_1$, which flows through closed switch $S_2$, is supplied from voltage source $V_{CB1}$, whereas current $i_2$, which flows trough closed switch $S_4$, is supplied from voltage source $V_2$, as shown in FIG. 6($d$). The stage in FIG. 6($d$) ends at $t=T_4$ when switched $S_2$ is turned off. After switch $S_2$ is turned off, the current which was flowing through the transistor of switch $S_2$ is diverted its output capacitance $C_2$, as shown in FIG. 6($e$). In this topological stage, current $i_1$ charges capacitor $C_2$ and discharges capacitor $C_3$ at the same rate since the sum of the voltages across capacitors $C_2$ and $C_3$ is equal to constant voltage $V_{CB1} + V_{CB2} = V_{IN}/2$. As a result, voltage across switch $S_2$ increases while voltage across switch $S_3$ decreases, as illustrated in FIGS. 7($f$) and ($g$). At the same time, the potential of point A starts decreasing causing a simultaneous decrease of voltage $v_{AB}$ from zero toward $-V_{IN}/2$ and primary voltage $v_P$ from $V_{IN}/4$ toward zero, as illustrated in FIGS. 7($i$) and ($j$). Since the decrease of the primary voltage is reflected into the secondary voltage $v_S$ also decreases toward zero, as shown in FIG. 7($o$). This stage ends at $t=T_5$ when capacitance $C_3$ is fully discharged and when current $i_1$ starts flowing through antiparallel diode $D_3$ of switch $S_3$, as shown in FIG. 6($f$). Because after $t=T_5$ negative voltage $V_{IN}/2$ is applied across magnetizing inductance $L_{MC}$, magnetizing current $i_{MC}$ starts linearly decreasing toward zero with constant slope $-V_{IN}/(2L_{MC})$, as shown in FIG. 7($l$). After $i_{MC}$ reaches zero at $t=T_6$, it continues to flow in the negative direction as indicated in FIG. 6($g$). The topological stage in FIG. 6($g$) ends at $t=T_7$ when switch $S_4$ is turned off and the converter enters the second half of the switching cycle. The operation during the second half of the switching cycle, i.e., the operation during time interval $T_7 - T_{13}$, is identical to the operation during the described interval $T_1 - T_7$ with the roles of switches $S_1$ and $S_2$ and switches $S_3$ and $S_4$ exchanged.

As can bee seen from waveforms ($m$) and ($n$) in FIG. 6, for all four primary switches $S_1$ through $S_4$ the magnitude of the current flowing trough the switch at the turn-off moment is the same, i.e., $$i_2(t = T_1) = \tag{11}$$

$$i_1(t=T_4) = i_2(t=T_7) = i_1(t=T_{10}) = \left|\frac{i_P}{2}\right| + |I_{MC}| = \left|\frac{I_O}{2n_{TR}}\right| + |I_{MC}|,$$

where, $I_O$ is load current, $n_{TR}$ is the turns ratio of the transformer, and $I_{MC}$ is the amplitude of the magnetizing current $i_{MC}$ According to Eq. (11), the commutation of the switches, during which the capacitance of the turned-off switch is charging (voltage across the switch is increasing) and the capacitance of the switch that is about to be turned on is discharging (voltage across the switch is decreasing), is done by the energy stored by both primary current $i_P$ and magnetizing current $i_{MC}$. While the commutation energy contributed by magnetizing current $i_{MC}$ is always stored in magnetizing inductance $L_{MC}$ of coupled inductor $L_C$, the commutation energy contributed by current $i_P$ is stored either in the filter inductance (not shown in FIG. 5) of the secondary-side output circuit, or the leakage inductances (not shown in FIG. 5) of transformers TR and coupled inductor $L_C$. Specifically, for inner switches $S_2$ and $S_3$, the commutation energy contributed by $i_P$ is stored in output-filter inductor $L_F$, whereas for outer switches $S_1$ and $S_4$ it is stored in the leakage inductance of the transformers. Since it is desirable to minimize the leakage inductance of transformer TR to minimize the secondary-side parasitic ringing, the energy stored in its leakage inductances is relatively small, i.e., much smaller than the energy stored in output-filter inductance. As a result, in the circuit in FIG. 4, it is easy to achieve ZVS of inner switches $S_2$ and $S_3$ in the entire load range, whereas ZVS of the outer switches $S_1$ and $S_4$ requires a proper sizing of the magnetizing inductance $L_{MC}$ since at light loads almost entire energy required to create the ZVS condition of outer switches $S_1$ and $S_4$ is stored in the magnetizing inductance.

Figure 8:
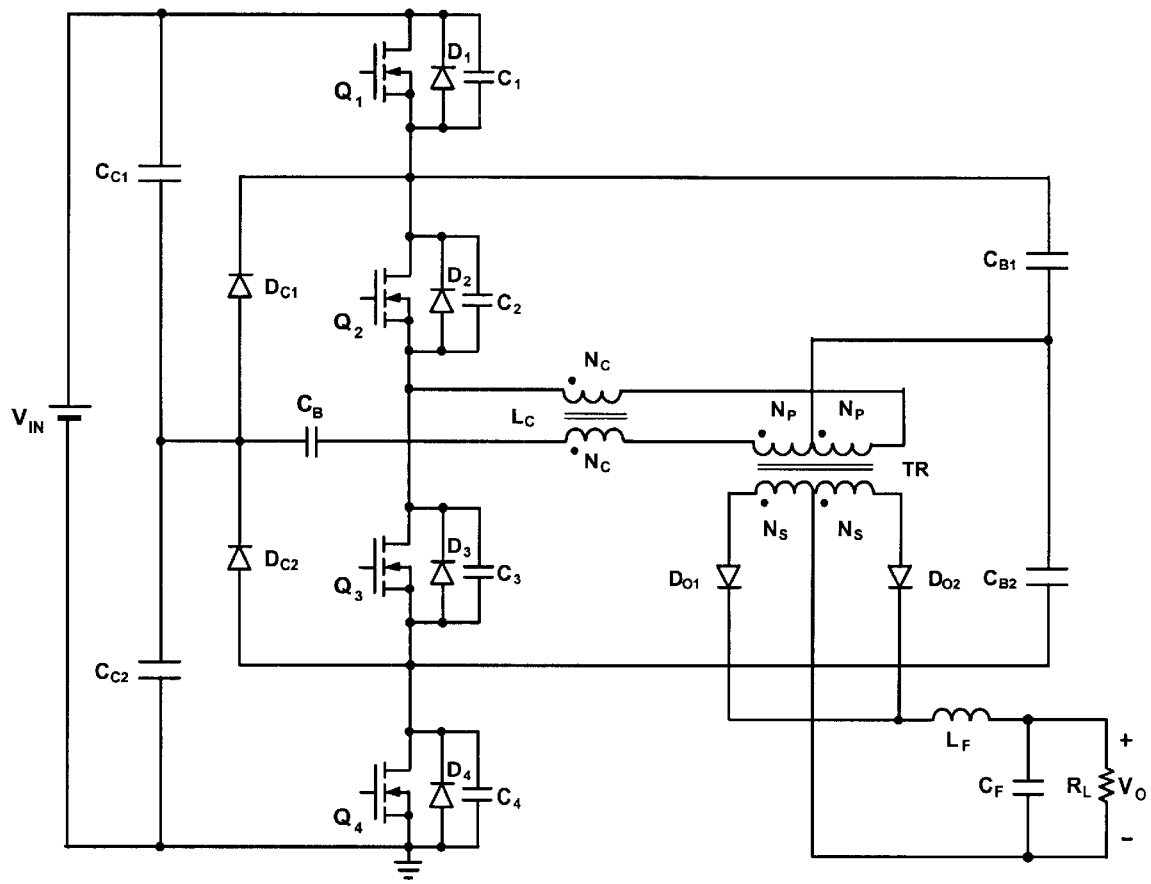
FIG. 8 shows another embodiment of the present invention that employs the transformer with the center-tapped primary winding.
Figure 9:
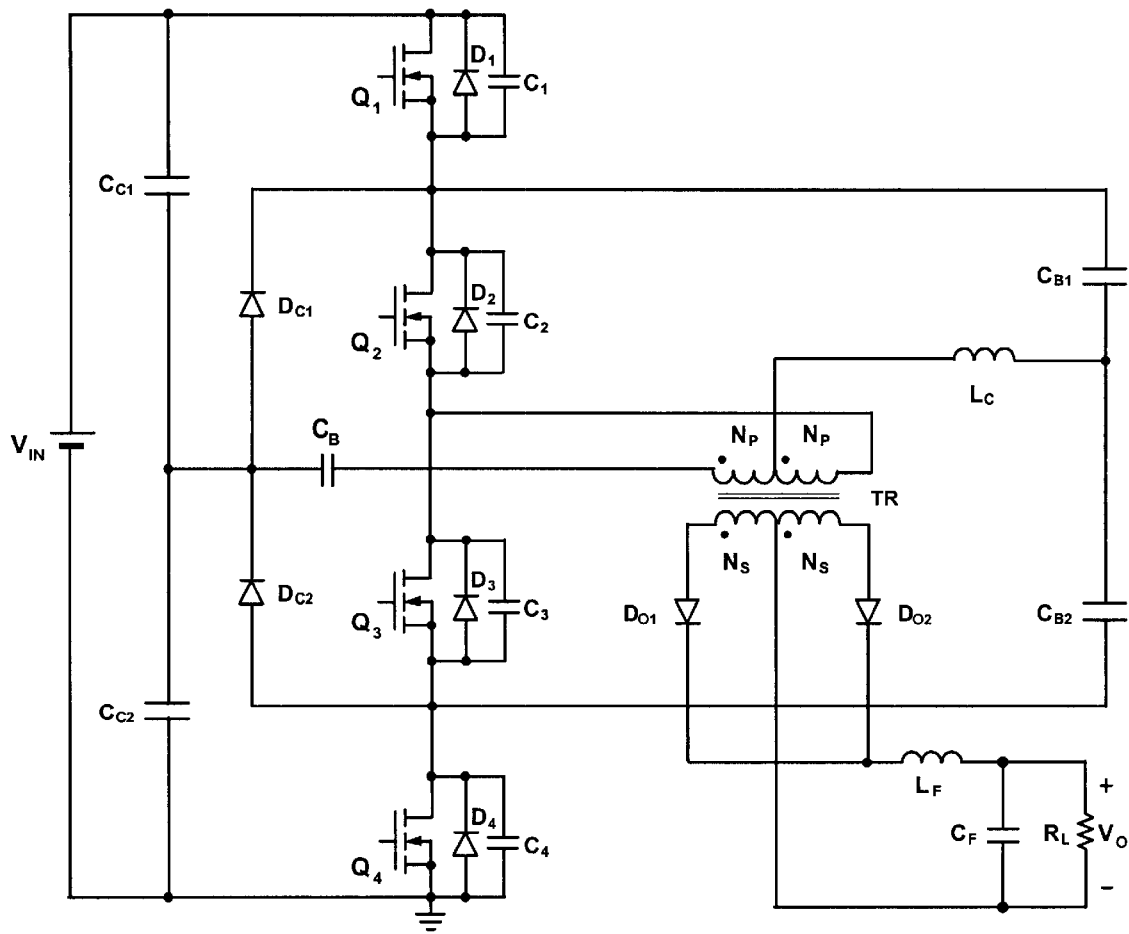
FIG. 9 shows yet another embodiment of the present invention that employs a single-winding inductor.

As explained in patent application Ser. No. 09/775,636, filed Feb. 5, 2001, in the full-bridge circuits with coupled inductor and isolation transformer, the inductor and transformer can exchange the rolls. Specifically, by adding a secondary winding to the coupled inductor, the coupled inductor can be used as a transformer to deliver power to the output circuit connected its secondary, whereas the magnetizing inductance of the transformer can be used as an inductor to store energy for ZVS. FIGS. 8 and 9 show two such embodiments. Generally, the operation of the circuits in FIGS. 8 and 9 is the same as the operation of the circuit in FIG. 4. The major difference is that in the circuit in FIG. 4 the maximum output voltage (volt-second product) is obtained when the phase shift between the pair of outer and inner switches is 180°, whereas the maximum output voltage (volt-second product) for the circuits in FIGS. 8 and 9 occurs when the phase shift is zero. This difference in the control characteristics of the different embodiments has a minor effect on the control loop design since a simple control-signal inversion in the voltage control loop is all that is need to get desired control-loop properties.

As already explained, in the circuits of this invention, it is more difficult to achieve ZVS of the outer pair of switches than the inner pair of switches because the energy available for creating the ZVS condition in the two pairs of switches is different. Generally, to achieve ZVS this energy must be at least equal to the energy required to discharge the capacitance of the switch which is about to be turned on and at the same time charge the capacitance of the switch that just has been turned off. At heavier load currents, ZVS is primarily achieved by the energy stored in the leakage inductances of transformer TR. As the load current decreases, the energy stored in the leakage inductances also decreases, whereas the energy stored in inductance $L_C$ increases so that at light loads $L_C$ provides an increasing share of the energy required for ZVS. In fact, at no load, this $L_C$ provides the entire energy required to create the ZVS condition. Therefore, if the value of $L_C$ is selected so that ZVS is achieved at no load and maximum input voltage $V_{IN(max)}$, ZVS is achieved in the entire load and input-voltage range.

Neglecting the capacitances of the transformer's windings, magnetizing inductance $L_{MC}$ necessary to achieve ZVS of the outer switches in the implementations in FIG. 4 is $$L_{MC} \leq \frac{1}{32Cf_S^2}, \quad (12)$$

whereas, inductance $L_C$ required to achieve ZVS of the inner switches in the implementations in FIGS. 8 and 9 is $$L_C \leq \frac{1}{128Cf_S^2}, \quad (13)$$

where C is the total capacitance across the primary switches (parasitic and external capacitance, if any) in the corresponding switch pairs.

As can be seen from FIG. 5, current $i_{MC}$ flowing through magnetizing inductance $L_{MC}$ introduces a current asymmetry between the inner and outer pair of switches in the implementations in FIG. 4. Namely, since in this circuit $i_1=i_2+2i_{MC}$ (as can be derived from Eqs. (6) and (7)), inner switches $S_2$ and $S_3$ always carry a higher current than outer switches $S_1$ and $S_4$. It can be shown that this current asymmetry between the inner and outer pair of switches is also present in the embodiments in FIGS. 8 and 9. Furthermore, if the current imbalance in the circuits in FIGS. 4, 8, and 9 is significant so that current $i_2$ flowing through outer switches $S_1$ and $S_4$ is significantly different than current $i_1$ flowing through inner switches $S_2$ and $S_3$, different size switches can be selected for the two pair of switches, which may reduce the cost of the implementation without sacrificing the circuit performance.

It should be noted that in the circuits of this invention the parasitic ringing on the secondary side is significantly reduced because these circuits do not require increased leakage inductances of the transformers, or a large external inductance to store the required energy for ZVS. Since the transformers in the circuits of this invention can be made with small leakage inductances, the secondary-side ringing between the leakage inductances of the transformers and the junction capacitance of the rectifier can be greatly reduced. Any residual parasitic ringing can be damped by a small (low-power) snubber circuit.

Figure 10:
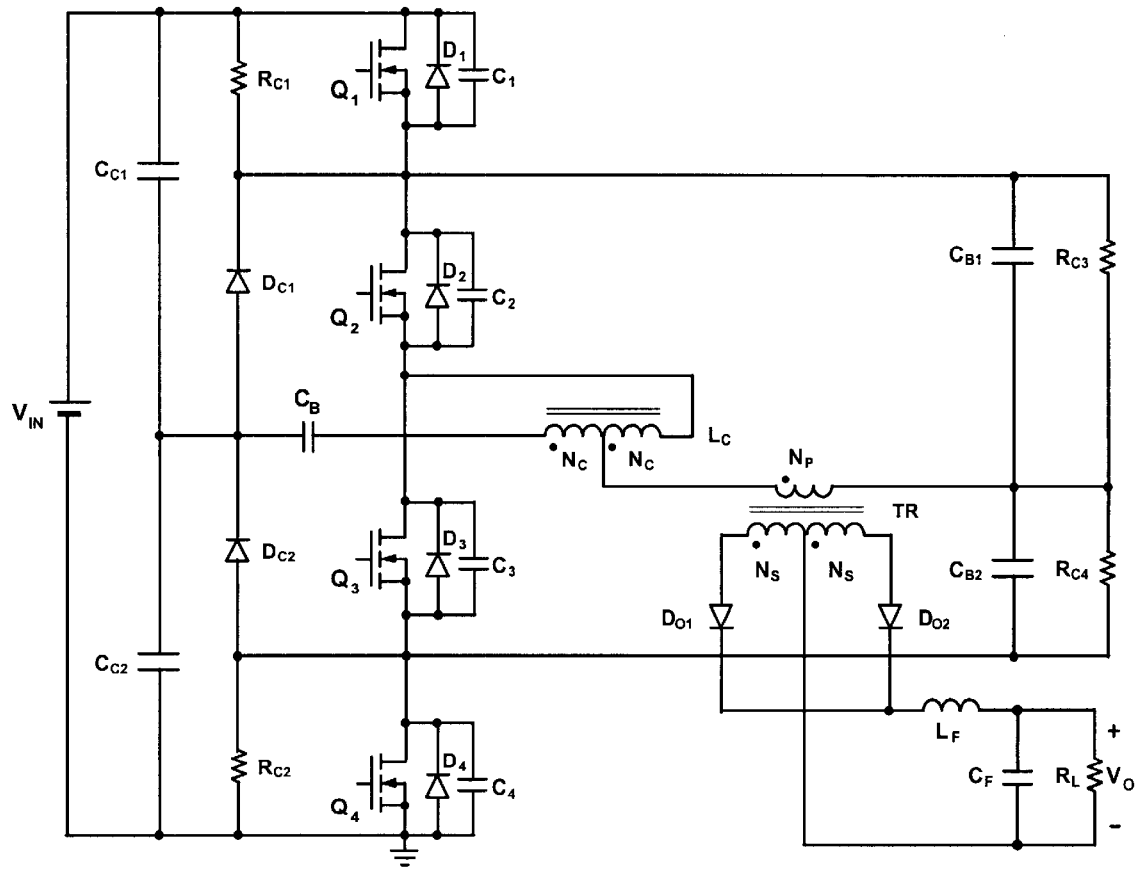
FIG. 10 shows an embodiment of the present invention with a precharging circuit for capacitors $C_{B1}$ and $C_{B2}$.

Finally, because voltage sources $V_{CB1}=V_{IN}/4$ and $V_{CB2}=V_{IN}/4$ in FIG. 5 are implemented with capacitors $C_{B1}$ and $C_{B2}$, respectively, as shown in FIGS. 4, 8, and 9, it is necessary to pre-charge these capacitors to $V_{IN}/4$ before the start-up moment. Namely, without pre-charging the voltages of the capacitors are zero, which causes a volt-second imbalance on the windings of the transformers during the start-up. This volt-second imbalance may lead to the saturation of the transformers, which produces excessive currents in the primary that may damage the switches. FIG. 10 shows an example of pre-charging circuit. The pre-charging circuit in FIG. 10 is implemented with resistors $R_{C1}$–$R_{C4}$. It should be noted that many other implementations of the pre-charging circuit are possible for any circuit of this invention.

It also should be noted the above detailed descriptions are provided to illustrate specific embodiments of the present invention and are not intended to be limiting. Numerous variations and modifications within the scope of this invention are possible. Moreover, the present invention is not limited to dc/dc converters, but it is also applicable to multi-level dc/ac inverters.

The present invention is set forth in the following claims:

What is claimed is:

1. A soft-switched, constant-frequency, three-level power converter with phase-shift modulation comprising:

an input power source;

four controllable switching devices connected in series adapted to connect to said input power source, each of said controllable switching devices comprising a switch, an antiparallel diode coupled across said switch and a capacitor coupled across said switch;

a transformer having a primary and secondary winding;

an inductor arranged on the primary side of said transformer so that when an outer switch and a corresponding inner switch of said four controllable switching devices connected in series are periodically open and closed in phase the volt-second product of a winding of said inductor is maximal and the volt-second product of said windings of said transformer is minimal, and when a said outer switch and a said corresponding inner switch of said four controllable switching devices connected in series are periodically open and closed in antiphase the volt-second product of said winding of said inductor is minimal and the volt-second product of said windings of said transformer is maximal;

a plurality of capacitors arranged on said primary side of said transformer providing power sources with voltages that are fractions of the voltage of said input power source and coupled to said four controllable switches so that the voltage across a nonconducting said controllable switch is a fraction of said voltage of said input source;

an output circuit for coupling a load to said secondary winding of said transformer.

2. A soft-switched, constant-frequency, three-level power converter with phase-shift modulation comprising:

an input power source;

four controllable switching devices connected in series adapted to connect to said input power source, each of said controllable switching devices comprising a switch, an antiparallel diode coupled across said switch and a capacitor coupled across said switch;

a transformer having a primary and secondary winding;

an inductor arranged on the primary side of said transformer so that when an outer switch and a corresponding inner switch of said four controllable switching devices connected in series are periodically open and closed in phase the volt-second product of a winding of said transformer is maximal and the volt-second product of a winding of said inductor is minimal, and when a said outer switch and a said corresponding inner switch of said four controllable switching devices connected in series are periodically open and closed in antiphase the volt-second product of said winding of said transformer is minimal and the volt-second product of said winding of said inductor is maximal;

a plurality of capacitors arranged on said primary side of said transformer providing power sources with voltages that are fractions of the voltage of said input power source and coupled to said four controllable switches so that the voltage across a nonconducting said controllable switch is a fraction of said voltage of said input source;

an output circuit for coupling a load to said secondary winding of said transformer.

3. A power converter as in claim 1 wherein the inductance of said inductor is selected so that the energy stored in said inductor is large enough to substantially discharge said output capacitance of each of said controllable switching devices that is about to be turned on so that voltage across said each of said controllable switching devices at the moment of turn-on is substantially reduced in the entire current range of said load.

4. A power converter as in claim 1 wherein said inductor is arranged as a coupled inductor having two windings that are connected in series, and wherein the magnetizing inductance of said coupled inductor is selected so that the energy stored in said magnetizing inductance is large enough to substantially discharge said output capacitance of each of said controllable switching devices that is about to be turned on so that voltage across said each of said controllable switching devices at the moment of turn-on is substantially reduced in the entire current range of said load.

5. A power converter as in claim 1 further comprising a capacitor for providing volt-second balance of said windings of said transformer and inductor.

6. A power converter as in claim 1 further comprising a clamping diode for limiting voltage across said controllable switching devices to a fraction of said voltage of said input power source.

7. A power converter as in claim 1 further comprising a plurality of resistors for precharging said plurality of said capacitors immediately after said power source is applied to said power converter so that said plurality of said capacitors provide required voltages for maintaining volt-second products of said windings of said transformer and inductor.

8. A power converter as in claim 1 wherein said primary winding of said transformer is center tapped.

9. A power converter as in claim 1 wherein said secondary winding of said transformer is center tapped.

10. A power converter as in claim 1 wherein said output circuit is the full-wave rectifier.

11. A power converter as in claim 1 wherein said output circuit is the current doubler.

12. A power converter as in claim 1 wherein said output circuit comprises a filter.

* * * * *